United States Patent [19]

Koike et al.

[11] Patent Number: 4,831,598

[45] Date of Patent: May 16, 1989

[54] PICTURE DISPLAY APPARATUS

[75] Inventors: Masahiro Koike, Hitachi; Fuminobu Takahashi, Katsuta; Satoshi Ogura, Hitachi; Izumi Yamada, Ibaraki, all of Japan

[73] Assignee: Hitachi, Ltd., Tokyo, Japan

[21] Appl. No.: 33,756

[22] Filed: Apr. 3, 1987

[30] Foreign Application Priority Data

Apr. 4, 1986 [JP] Japan .................................. 61-76570

[51] Int. Cl.$^4$ .............................................. G03B 42/06
[52] U.S. Cl. ......................................... 367/7; 364/726; 342/196
[58] Field of Search ........................ 367/7, 13, 46, 124, 367/901; 342/196, 197, 192; 364/576, 726, 413.2; 128/660.04, 662.02

[56] References Cited

U.S. PATENT DOCUMENTS

| | | | |
|---|---|---|---|
| 4,003,054 | 1/1977 | Goldstone | 342/174 |
| 4,042,928 | 8/1977 | Altes | 342/192 |
| 4,084,148 | 4/1978 | Koshikawa | 367/93 |

Primary Examiner—Thomas H. Tarcza
Assistant Examiner—Tod R. Swann
Attorney, Agent, or Firm—Fay, Sharpe, Beall, Fagan, Minnich & McKee

[57] ABSTRACT

Disclosed is a picture display apparatus connected to a low resolution ultrasonic inspector so as to display a picture with high resolution. In the apparatus, an approximate spectrum of a theoretical spectrum representing an object having a known shape as a reference and a spectrum obtained through measurement of the known-shaped object are subject to Fourier transformation so that a transfer function of a measurement device is calculated from the ratio between the respective values obtained through the two operations of Fourier transformation, whereby an unknown shape of an object is displayed on the basis of the transfer function and Fourier transformation values of a measured spectrum of the object having the unknown shape. A modified Gaussian distribution obtained by combining two Gaussian distributions, in which the transformation values of the spatial spectrum of the known shape are reduced in a high frequency range and in which oscillations are less spread in the high frequency range, is employed as the approximate spectrum of the theoretical spectrum representing the known-shaped object, so that the high frequency components of the spatial spectrum of the unknown shape can be reduced and therefore a clear picture can be displayed with high resolution.

23 Claims, 8 Drawing Sheets

| | | RECTANGULAR | COS | MODIFIED COS | GAUSSIAN | MODIFIED GAUSSIAN |
|---|---|---|---|---|---|---|
| $l = $ 4mm | $l'$(mm) | 3.2 | 3.5 | 3.6 | 4.4 | 3.8 |
| | M (NUMBER) | 3 | 1 | 1 | 1 | 1 |

REFERENCE WIDTH $l_0 = 3$ mm
$l'$: RESULTANT WIDTH IN APPARATUS ACCORDING TO THE INVENTION
M: THE NUMBER OF PEAKS OF INTENSITY NOT SMALLER THAN 0.5

$l_0$ : REFERENCE WIDTH
$l$ : TRUE WIDTH
$l'$ : RESULTANT WIDTH IN THE APPARATUS OF THE INVENTION

PICTURE DISPLAY APPARATUS

BACKGROUND OF THE INVENTION

The present invention generally relates to a picture display apparatus, and particularly relates to an apparatus which is to be connected to a testing device having a purpose of displaying the result of test as a picture, for example, a measurement device of low resolution such as an ultrasonic inspector, a radiation computerized tomography, a radar pickup device, etc., so as to display a picture with high resolution.

As disclosed in the publication of JP-A-No.-50-137184, the conventional picture display apparatus could be applied only to a testing or measurement device capable of approximating the spatial resolution with a Gaussian distribution, and inverse Weierstrass transformation was applied to a measured spectrum so as to derive a spectrum improved in resolution. Accordingly, the conventional picture display apparatus could not be used for a measurement device having a spatial resolution having a distribution which is unknown or which is different from a Gaussian distribution.

The above-mentioned conventional picture display apparatus could be applied only in the case where the spatial resolution of the measurement device used was known or had a Gaussian distribution. Accordingly, it was required to obtain the spatial resolution of the measurement device in advance by any other means. In order to satisfy this requirement, a picture display apparatus has been proposed in which the resolution peculiar to the measurement device is calculated on the basis of a spectrum representing an object having a known shape and a measured spectrum of the same object, so that the measured spectrum deteriorated on account of the low resolution of the measurement device is automatically converted into a spectrum of high resolution so as to make it possible to display a clear and detailed picture. In this picture display apparatus, however, there has been such a problem that measurement errors or the like contained in the measured spectrum may make the values of the measured spectrum large in a high frequency range to produce high frequency oscillations in a picture displayed to thereby make the picture unclear. This apparatus is disclosed in Japanese Patent Application No. 60-115136 filed in the name of the same assignee on July 16, 1985 and laid-open on Jan. 26, 1987 under Laid-Open No. 62-017654.

SUMMARY OF THE INVENTION

It is therefore an object of the present invention to provide a picture display apparatus capable of displaying a clear and detailed picture.

To attain the above object, according to an aspect of the present invention, the picture display apparatus in which an approximate spectrum of a theoretical spectrum representing an object having a known shape as a reference and a spectrum obtained through measurement of the known-shaped object are subject to Fourier transformation and a transfer function of a measurement device is calculated from the ratio between the respective values obtained through the two operations of Fourier transformation to thereby display an unknown shape of an object on the basis of the transfer function and Fourier transformation values of a measured spectrum of the unknown-shaped object, is featured in that a modified Gaussian distribution obtained by combining two Gaussian distributions is employed as the approximate spectrum of the theoretical spectrum representing the known-shaped object so that the Fourier transformation values of the spatial spectrum of the known shape are reduced in a high frequency range and oscillations are less spread in the high frequency range, thereby reducing the high frequency components of the spatial spectrum of the unknown shape to be displayed.

Since a modified Gaussian distribution obtained by combining two gaussian distributions is employed as the approximate spectrum of the theoretical spectrum representing the known-shape of the reference object, the Fourier transformation values of the spatial spectrum of the known shape are reduced in a high frequency range and oscillations are less spread in the high frequency range. Accordingly, even if noises, measurement errors or the like, are included in the measured spectrum to make the Fourier transformation values of the measured spectrum large in the high frequency range, the Fourier transformation values of the known shape may act as windows for the measured spectrum so as to cancel the causes for such as noises, measurement errors or the like, so that the high frequency components of the spectrum of the unknown shape to be displayed are reduced so as to make it possible to display a clear picture with high resolution.

Preferably, the picture display apparatus comprises means for approximating the measured spectrum with B-spline curves of m order.

In the case where there are variations in values of a spectrum distribution obtained through measurement of an object having a known shape or an object having an unknown shape, the measured spectrum is not smooth and has discontinuous points. If a spatial spectrum having discontinuous points is subject to Fourier transformation, the frequency spectrum obtained has high frequency components large in value. Accordingly, if the variations of intensity of the spectrum due to the variations of measurement errors in the measured spectrum are reduced to make the discontinuous points smooth, the high frequency components can be further reduced to make it possible to obtain a clear picture.

BRIEF DESCRIPTION OF THE DRAWINGS

The above and other objects, features and advantages of the present invention will become apparent upon a reading of the following detailed description and drawings, in which.

DESCRIPTION OF THE PREFERRED EMBODIMENTS

Prior to illustration of preferred embodiments of the invention, description will be made first about the principle of the invention. In a nondestructive testing or measurement device, in which an internal fault or a shape of an internal structure is displayed as a picture, for example, such as an ultrasonic inspector, a radiation computerized tomography, a microwave radar prospector, etc., there occurs blur in the picture on account of spatial expansion of the ultrasonic wave, the radiation rays, or the microwave, the size of aperture at the sensor receiver portion, and so on. The blur can be regarded as spatial resolution peculiar to the measurement device. The spatial resolution means a spatial expansion of a picture when a point object is displayed. If the spatial resolution peculiar to the measurement device is grasped and the blur caused by the spatial resolution is corrected, the true shape can be approximately displayed. The present invention provides an apparatus in which, in displaying a picture, the influence of high frequency noises are reduced to make it possible to display a picture more approximate to the true shape.

Figure 1:
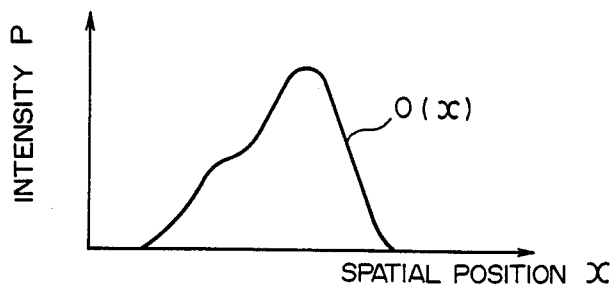
FIG. 1 is a diagram showing an example of a spectrum measured by a measurement device of low resolution.
Figure 2:
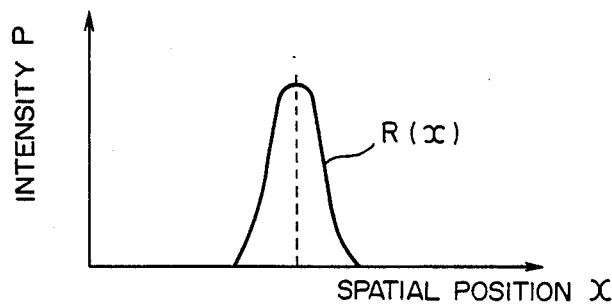
FIG. 2 is a diagram showing an example of spatial resolution including blur of the measurement device.

First, the principle of deriving a picture having no blur from a picture having blur in the case where the spatial resolution is known will be described. For the sake of simplicity, consideration is made about a case of mathematical processing for correcting a one-dimensional blur. Although a picture is generally two-dimensional, a one-dimensional picture is hereinafter referred to as "a spatial spectrum" as a matter of convenience. It is defined that the abscissa and ordinate of the spatial spectrum respectively represent the spatial position and intensity of the spatial spectrum. FIG. 1 shows a spatial spectrum O(x) measured by a measurement device and having blur, and FIG. 2 shows a spatial spectrum R(x) of spatial resolution including blur. If a spatial spectrum having no blur is represented by I(x), the relation expressed by the following equation (1) is satisfied between the spatial spectra O(x) and R(x).

$$O(x) = \int_{-\infty}^{\infty} I(\sigma) R(x - \sigma) d\sigma \quad (1)$$

The equation (1) is called "convolution integration". In the equation (1), $I(\sigma)$ is obtained by substituting the variable x by another variable $\sigma$ in I(x), and $R(x-\sigma)$ is obtained in such a manner that $R(\sigma)$ obtained by substituting the variable x by another variable $\sigma$ in I(x) is reversed about a vertical axis of the coordinate representing the function $R(\sigma)$ to thereby obtain $R(-\sigma)$ and then $R(-\sigma)$ is shifted by x to thereby obtained $R(x-\sigma)$.

The following equation (2) is derived by performing Fourier transformation on the both sides of the equation (1).

$$\tilde{O}(\nu) = \tilde{I}(\nu) \cdot \tilde{R}(\nu) \quad (2)$$

where $\tilde{O}(\nu)$, $\tilde{I}(\nu)$, and $\tilde{R}(\nu)$ represent functions obtained by performing Fourier transformation on O(x), I(x), and R(x) respectively. Each of the functions $\tilde{O}(\nu)$, $\tilde{I}(\nu)$, and $\tilde{R}(\nu)$ is called a frequency spectrum, and the respective frequency functions $\tilde{O}(\nu)$, $\tilde{I}(\nu)$, and $\tilde{R}(\nu)$ are defined by the following equations (3), (4) and (5).

$$\tilde{O}(\nu) = \int_{-\infty}^{\infty} O(x) \cdot e^{-j2\pi\nu x} dx \quad (3)$$

$$\tilde{I}(\nu) = \int_{-\infty}^{\infty} I(x) \cdot e^{-j2\pi\nu x} dx \quad (4)$$

$$\tilde{R}(\nu) = \int_{-\infty}^{\infty} R(x) \cdot e^{-j2\pi\nu x} dx \quad (5)$$

where j is an imaginary unit and $\nu$ represents a spatial frequency. Accordingly, if spatial spectra O(x) and R(x) are known, an unknown spatial spectrum I(x) can be obtained in such a manner as follows. The frequency spectrum $\tilde{I}(\nu)$ can be obtained by the following equation (6) derived from the equation (2).

$$\tilde{I}(\nu) = \tilde{O}(\nu)/\tilde{R}(\nu)$$

This frequency spectrum $\tilde{I}(\nu)$ can be brought back to the actual spatial spectrum I(x) through reverse Fourier transformation by the following equation (7).

$$I(x) = \int_{-\infty}^{\infty} \tilde{I}(\nu) \cdot e^{j2\pi\nu x} d\nu \quad (7)$$

$$= \int_{-\infty}^{\infty} \{\tilde{O}(\nu)/\tilde{R}(\nu)\} \cdot e^{j2\pi\nu x} d\nu$$

In the equation (7), $\tilde{O}(\nu)$ can be obtained from measured spatial spectrum O(x) through Fourier transformation, however, there is a problem as to a manner how to obtain the spatial spectrum R(x) which is the source function of $\tilde{R}(\nu)$. If R(x) is defined as the spatial resolution of the measurement device, when a point-like object is made to be a picture by a measurement device so as to display the picture, the spatial expansion of the picture can be regarded as the spatial resolution R(x). In an actual case, however, such a point-like object cannot exist and the spatial resolution R(x) may vary depending on the position of the point-like object. Accordingly, an object having a known shape is made to be a picture by a measurement device and a true shape is compared with the picture to thereby derive the spatial resolution of the measurement device. The function $\tilde{R}(\nu)$ derived from this spatial resolution through Fourier transformation can be regarded as the transfer function of the measurement device. By the use of this transfer function $\tilde{R}(\nu)$, a picture of an object is derived on the basis of the equation (7). If a known shape and a picture thereof are represented by spatial spectra Is(x) and Os(x), the transfer function $\tilde{R}(\nu)$ can be obtained on the basis of the following equation (8) which is derived from the equation (2).

$$\tilde{R}(\nu) = \tilde{O}s(\nu)/\tilde{I}s(\nu) \quad (8)$$

where $\tilde{O}s(\nu)$ and is $(\nu)$ are frequency spectra obtained from the spatial spectra Os(x) and Is(x) through Fourier transformation. Thus, the transfer function $\tilde{R}(\nu)$ of the measurement device can be derived, and in order to correct a picture obtained through measurement and having blur, a spatial spectrum I(x) representing a picture approximate to a true shape can be calculated on the basis of the equation (7) by using the derived $\tilde{R}(\nu)$ of the measurement device.

Figure 3A:
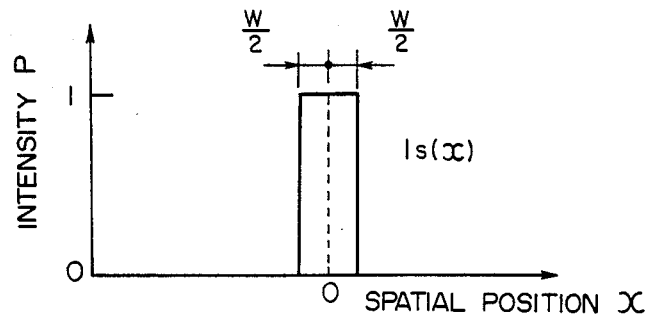
FIGS. 3A and 3B are diagrams respectively showing a spatial spectrum and a frequency spectrum in the case where the reference shape is rectangular.
Figure 3B:
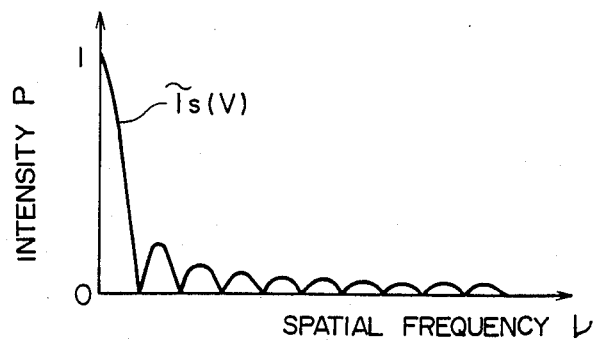

In this case, the possibility of generation of high frequency components in the spatial spectrum I(x) of the unknown shape calculated in the above-mentioned procedure is determined depending on the selection as to what kind of shape is used as the spatial spectrum Is(x) representing a known shape. For example, if the spatial spectrum Is(x) representing a known shape is rectangular as shown in FIG. 3A, the frequency spectrum $\tilde{I}s(\nu)$ derived from the spatial spectrum Is(x) through Fourier transformation has a shape as shown in FIG. 3B. In this case, as seen in FIG. 3B, the spectrum has large values in a high frequency range so that high frequency components are generated in the spatial spectrum I(x) of the unknown shape. In order to reduce these high frequency components, the spatial spectrum Is(x) of the known shape is selected to satisfy the following conditions: (i) The expansion of the spatial spectrum Is(x) is definite; (ii) The spatial spectrum Is(x) has small values in a high frequency range; and (iii) In a frequency domain of the spatial spectrum Is(x), the oscillation does not extend in a wide range. Accordingly, the inventors have examined various shapes, such a gaussian distribution, a cosine distribution, a cosine distribution about a position where the intensity becomes half (a modified cosine distribution), etc., under the condition that the width of the spatial spectrum Is(x) at a position where the intensity of the spatial spectrum Is(x) becomes half (hereinafter referred to as "half-value width W") is made to correspond to the width of the rectangle shown in FIG. 3A. As the result of examination in view of the above-mentioned three conditions, it has been found that such a distribution as expressed by the following equation (9), which is a combination of two Gaussian distributions and which is therefore referred to as a modified Gaussian distribution in this specification, is optimum.

$$Is(x) = \quad (9)$$

$$\begin{cases} \exp\left\{-\ln 2 \left(\frac{2x}{w}\right)^2\right\} & \left(-\frac{w}{2} \leq x \leq \frac{w}{2}\right) \\ 1 - \exp\left\{-\ln 2 \left(\frac{2x}{w} - 2\right)^2\right\} & \begin{pmatrix} -w \leq x \leq -\frac{w}{2} \\ \frac{w}{2} \leq x \leq w \end{pmatrix} \\ 0 & \begin{pmatrix} x \leq -w \\ x > -w \end{pmatrix} \end{cases}$$

Figure 4A:
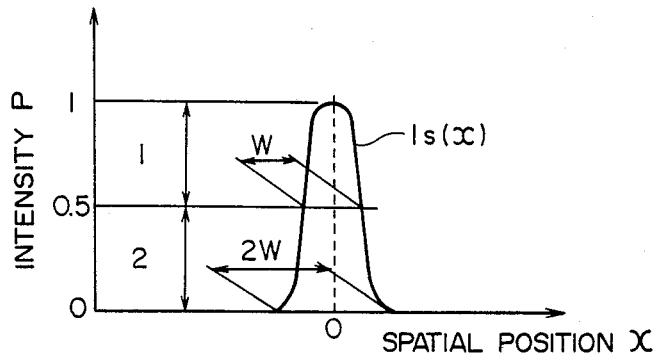
FIGS. 4A and 4B are diagrams respectively showing a spatial spectrum and a frequency spectrum in the case where the reference shape is a modified Gaussian distribution which is a foundation of the present invention.
Figure 4B:
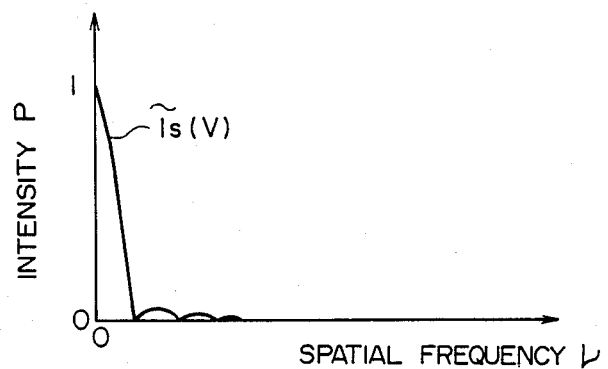

FIG. 4A shows the spatial spectrum Is(x) expressed by the equation (9) and FIG. 4B shows the frequency spectrum $\tilde{I}s(\nu)$ derived from the spatial spectrum Is(x) through Fourier transformation. In this case, the above-mentioned three conditions are satisfied so that the high frequency components in the spatial spectrum I(x) of an unknown shape can be reduced and a picture approximate to a true shape can be obtained.

Figure 5:
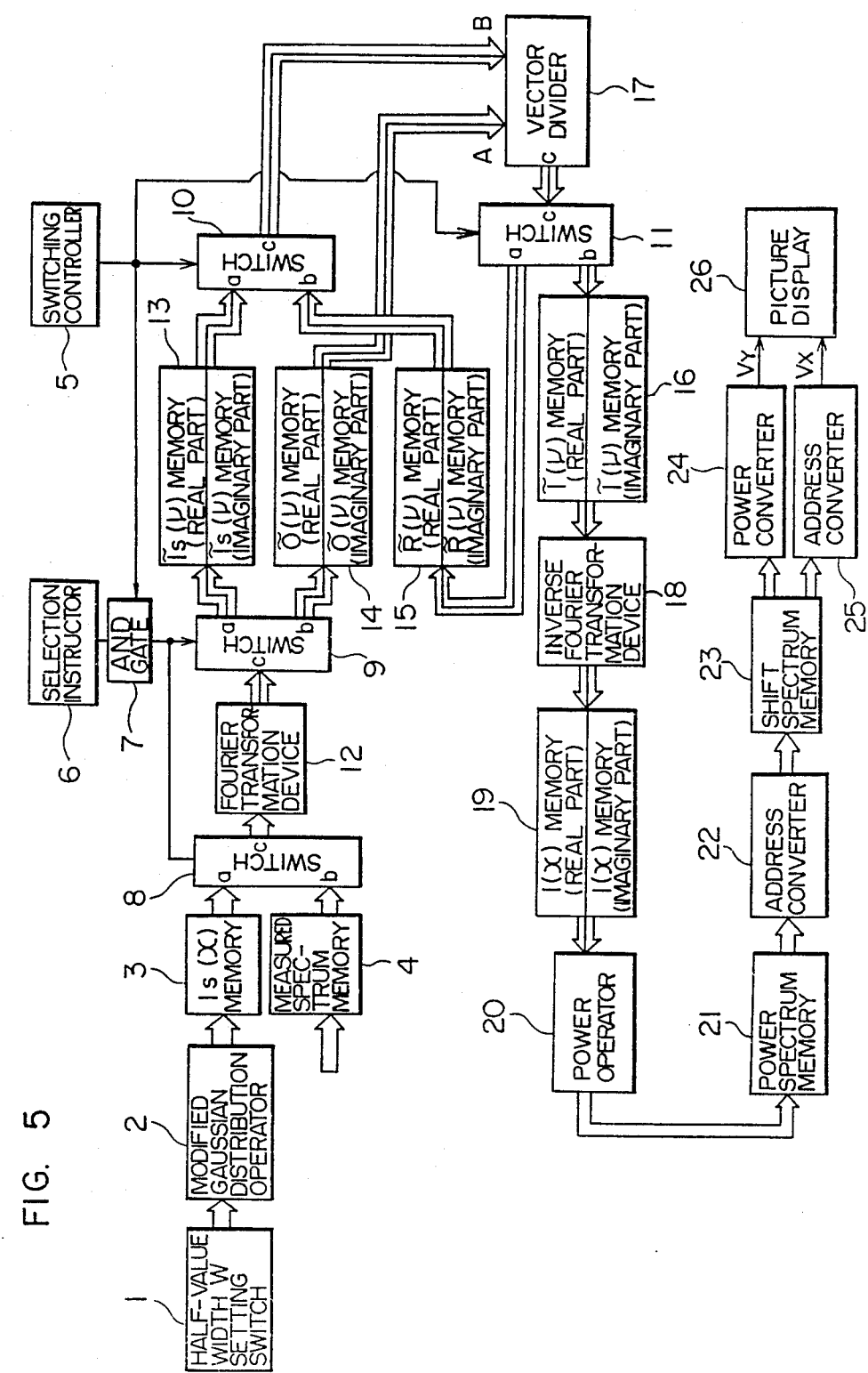
FIG. 5 is a diagram showing a basic arrangement of the picture display apparatus according to the present invention.

The principle of the present invention has thus been described. Referring to FIG. 5, now, an embodiment of the invention will be described hereunder.

First, the transfer function $\tilde{R}(\nu)$ of the measurement device is obtained. If the output of a switching controller 5 is made to be "1", the terminals a and c are made conductive with each other in each of switches 10 and 11, while if the output of the switching controller 5 is made to be "0", the terminals b and c are made conductive with each other in the same switches. Switches 8 and 9 are controlled by the output of an AND gate 7 or a logical product of the respective outputs of the switching controller 5 and a selection instructor 6. That is, the terminals a and c of each of the switches 8 and 9 are made conductive with each other only when both the respective outputs of the switching controller 5 and the selection instructor 6 are "1", while the terminals b and c of the same are made conductive with each other during the periods in other conditions of the respective outputs of the switching controller 5 and the selection instructor 6. Accordingly, first, both the respective outputs of the switching controller 5 and the selection instructor 6 are made to be "1". A half-value width of a known shape as a reference is set through a half-value width setting switch 1. Upon reception of this half-value width, a modified Gaussian distribution operator 2 performs operations to obtain a modified gaussion distribution on the basis of the equation (9), the result being stored in an Is(x) memory 3. Accordingly, the half-value width setting switch 1, the modified Gaussian distribution operator 2 and the Is(x) memory 3 constitute a modified Gaussian distribution holding means. In this case, in the Is(x) memory 3, the address is made to correspond to the spatial position and the intensity of spectra is stored as the contents. The contents of the Is(x) memory 3, that is the spacial spectrum distribution corresponding to the theoretical spectrum shape of the known shape sample, are applied to a Fourier transformation device 12 through the switch 8 and a frequency spectrum $\tilde{I}s(\nu)$ is derived on the basis of the equation (4). The frequency spectrum $\tilde{I}s(\nu)$ is applied to an $\tilde{I}s(\nu)$ memory 13 and the real part and the imaginary parts are stored separately from each other in the $\tilde{I}s(\nu)$ memory 13. Then, the output of the selection instructor 6 is made to be "0" so that the terminals b and c of each of the switches 8 and 9 are made conductive with each other.

A spatial spectrum O(x) obtained through measurement on an object having a reference shape is applied from a measurement device to a an input device that is a measured spectrum memory 4 so as to be stored therein. The contents of the measured spectrum memory 4 is applied to the Fourier transformation device 12 through the switch 8. Upon reception of the contents of the measured spectrum memory 4, the Fourier transformation device 12 performs operations to obtain a spatial spectrum $O(\nu)$ are stored separately from each other in an $O(\nu)$ memory 14. The contents of the $O(\nu)$ memory 14 are applied to a port A of a vector divider 17 and the contents of the $Is(\nu)$ memory 13 are applied to another port B of the same vector divider 17 through the switch 10. the vector divider 17 performs operations to obtain a real value Cr and an imaginary value Ci on the basis of the following equation (10) by the use of a real part Ar and an imaginary part Ai of the input to the port A and a real part Br and an imaginary part Bi of the input to the port B.

$$Cr = \frac{ArBr + AiBi}{Br^2 + Bi^2} \quad (10)$$

$$Ci = \frac{AiBr - ArBi}{Br^2 + Bi^2}$$

The values Cr and Ci are stored in a real part and an imaginary part of an $\tilde{R}(\nu)$ memory 15 through the switch 11. In this manner, the transfer function $\tilde{R}(\nu)$ of the measured device has been obtained. The values Cr and Ci of the equation (10) represented the real part and the imaginary part of the transfer function $\tilde{R}(\nu)$ obtained by the division of $\tilde{O}s(\nu)/\tilde{I}s(\nu)$.

Next, an unknown shape of an object is displayed on the basis of the measurement on the object having the unknown shape. The output of the switching controller 5 is made "0" and a spatial spectrum O(x) obtained through the measurement on the object having the unknown shape is applied to the Fourier transformation device 12 from the measurement device through the switch 8. The Fourier transformation device 12 performs operations to obtain a frequency spectrum $\tilde{O}(\nu)$ on the basis of the equation (3), and the real and imaginary parts of the thus obtained frequency spectrum $\tilde{O}(\nu)$ are stored separately from each other in the $\tilde{O}(\nu)$ memory 14. The contents of the $\tilde{O}(\nu)$ memory 14 are applied to the port A of the vector divider 17 and the contents of the R(v) memory 15 are applied to the port B of the same vector divider 17 through the switch 10. The vector divider 17 performs an operation to obtain values Cr and Ci on the basis of the equation (10) and thus obtained values Cr and Ci are respectively stored in a real part and an imaginary part of a frequency spectrum $\tilde{I}(\nu)$ memory 16. A reverse Fourier transformation device 18 performs an operation to obtain a spatial spectrum I(x) from the contents of the $\tilde{I}(\nu)$ memory 16 on the basis of the equation (7) and the real part Ir and the imaginary part Ii of the thus obtained spatial spectrum I(x) are stored in a real part and an imaginary part of an I(x) memory 19. A power operator 20 performs an operation to obtain an intensity Ip on the basis of the following equation (11) by the use of the real part Ir and the imaginary part Ii of the I(x) memory 19, and thus obtained intensity Ip is stored in a power spectrum memory 21.

$$Ip = \sqrt{Ir^2 + Ii^2} \quad (11)$$

An address converter 22 shifts the addresses of the I(x) memory 19 on the basis of the following equation (12) so as to store the rearranged contents of the I(x) memory 19 in a shift spectrum memory 23. Assuming now that the number of the addresses of the shift spectrum memory 23 is 2N and that the contents at the k-th address of the power spectrum memory 21 are represented by Ip(k), the contents Isp(m) of the m-th address of the shift spectrum memory 23 are determined on the basis of the following equation (12).

$$Isp(m) = \begin{cases} Ip(m + N) & (1 \leq m \leq N) \\ Ip(m - N) & (N < m \leq 2N) \end{cases} \quad (12)$$

Receiving voltage values Vx and Vy each proportional to the contents isp(m) at the m-th address of the shift spectrum memory 23 from an address converter 25 and a power converter 24 respectively as a horizontal and a vertical deflection signal, a picture display 26 displays a picture having no blur.

Figure 6:
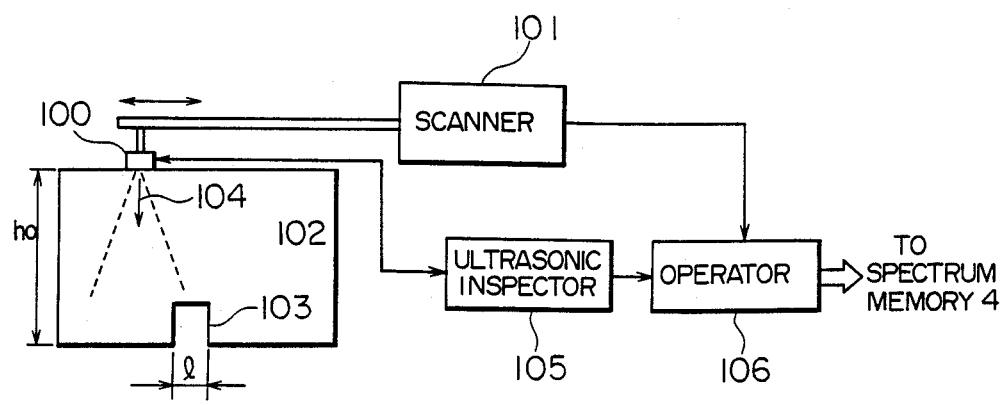
FIG. 6 is a diagram showing an arrangement of the apparatus in the case where a groove in the sample is measured by ultrasonic wave and operated into a picture to be displayed.
Figure 7A:
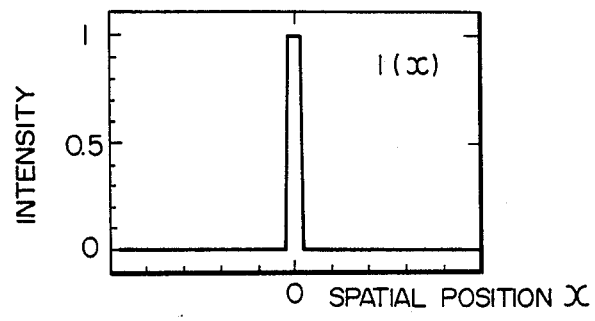
FIGS. 7A and 7B are diagrams respectively showing a spatial spectrum and a measurement spectrum illustrating the reference shape under the condition of FIG. 6.
Figure 7B:
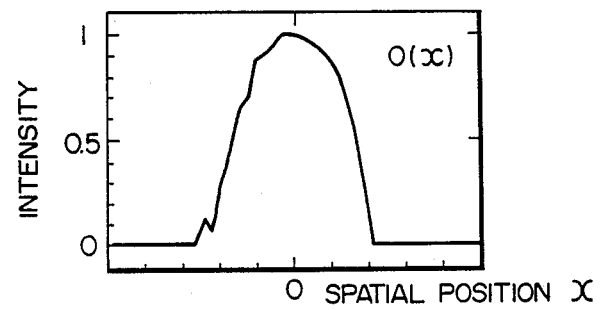

In the following, description will be made as to an example of a case where the apparatus according to the present invention is applied to a resultant picture of a rectangular groove existing in a sample measured by an ultrasonic inspector. FIG. 6 shows an example of an arrangement to reproduce the result of measurement of an ultrasonic inspector in the form of a picture. In response to a signal from an ultrasonic inspector 105, an ultrasonic beam 104 is transmitted to a sample 102 from a probe 100. The probe 100 receives an ultrasonic wave reflected from the surface of a rectangular groove 103 of the sample 102. The probe 100 is scanned in the X-direction by a scanner 101. An operator 106 measures a time interval t(x) from transmission to reception of the ultrasonic signal in a spatial position x and calculates a depth h(x) of the groove on the basis of the following equation (13).

$$h(x) = ho - (v \cdot t(x)/2) \quad (13)$$

where ho and v represent a height of the sample 102 and a sonic velocity in the sample 102. This h(x) has a distribution substantially similar to the intensity distribution of the ultrasonic wave received by the probe 100. The spatial position x and the intensity of the ultrasonic wave received at each position or the depth at each position are transmitted from the operator 106 to the measured spectrum memory 4. Since the ultrasonic beam 104 spreads in the sample 102, such a spatial spectrum O(x) as shown in FIG. 7B is obtained when a rectangular groove shown in FIG. 7A is measured. By the use of those spatial spectra I(x) and O(x), the result of measurement is made to be picture in the apparatus of FIG. 5. In this connection, the reason why the above spatial spectrum as shown in FIG. 7B is obtained will be explained with reference to FIGS. 8A and 8B.

Figure 8A:
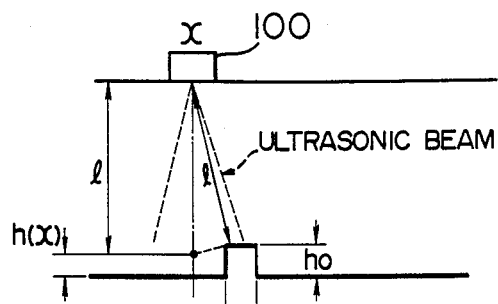
FIGS. 8A and 8B are schematic diagrams useful to explain the relation among the probe, the groove and the resultant spatial spectrum of the groove.

The ultrasonic beam spreads as shown in FIG. 8A. Therefore, the reflected ultrasonic wave can be received by the probe 100 even if the groove is not right beneath the probe position x.

Figure 8B:
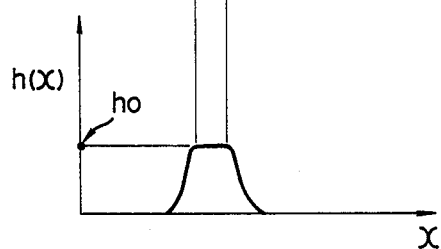

When a reflected ultrasonic wave is received at the probe position x, the received wave is usually regarded as being reflected from right beneath the position x. Accordingly, when the probe receives the ultrasonic wave reflected from a position which is shifted from the position right beneath the position x as shown in FIG. 8A, calculation of h(x) according to the equation (13) is carried out on the basis of a time interval which is longer than that obtained when the probe is right above the groove, and therefore, the resultant depth is smaller than the depth of the groove. Therefore, the distribution of h(x) as shown in FIG. 8B is obtained.

Figure 9A:
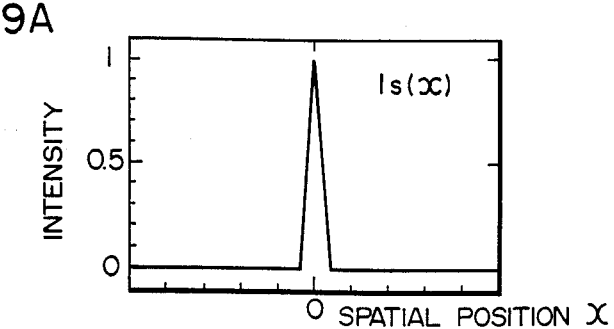
FIGS. 9A, 9B and 9C are diagrams respectively showing the result in the case where the invention is applied to the spectrum measured under the condition of FIG. 6.
Figure 9B:
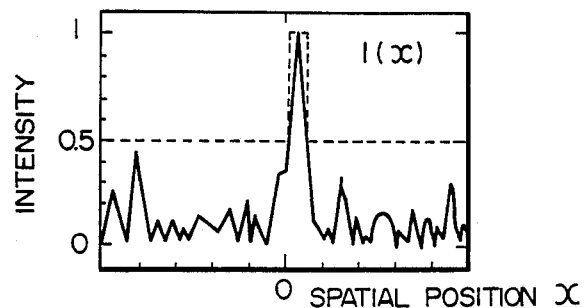
Figure 9C:
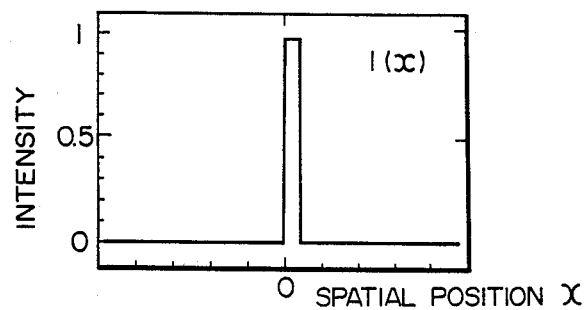
Figure 10:
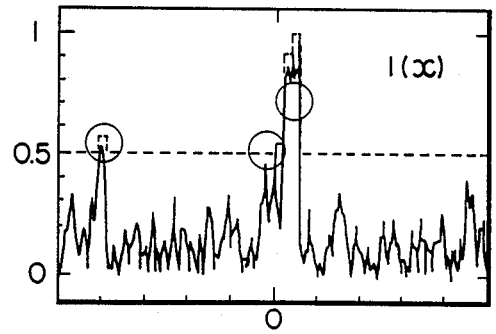
FIG. 10 is a diagram showing a spatial spectrum of an unknown shape obtained in the case where the reference shape is made rectangular under the condition of FIG. 6.
Figures 11, 12:
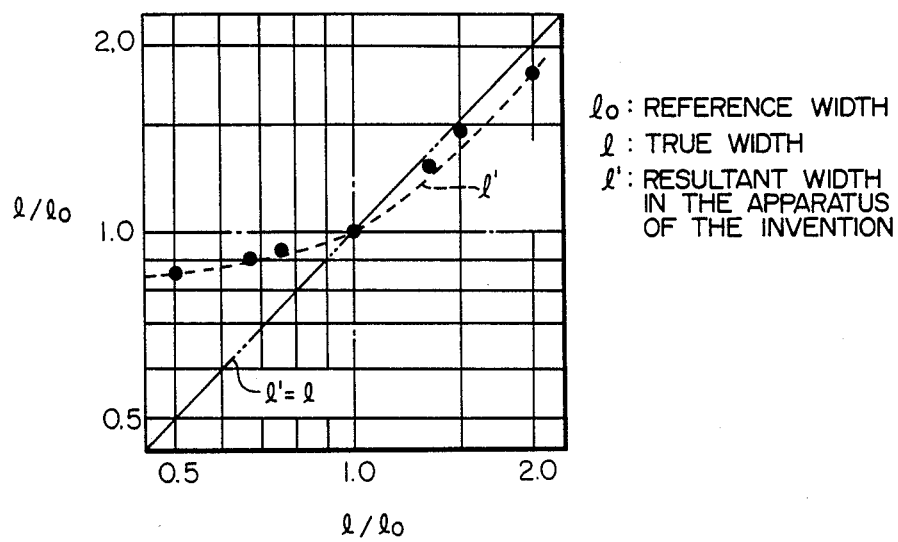
FIG. 11 is a table showing a comparison among various kinds of distribution reference shapes.
FIG. 12 is a graph showing the result in the case where the invention is applied to the various groove widths under the condition of FIG. 6.

Assume now that a transfer function R(ν) of the measurement device is obtained so as to obtain a shape of a groove having an unknown width l by the use of a groove having a width lo as a known reference shape. If the width lo is set by the half-value width setting switch 1, the modified gaussian distribution operator 2 performs an operation to obtain a spatial spectrum I(x) on the basis of the equation (9) and the result is stored in the Is(x) memory 3. The spatial spectrum Is(x) has such a shape as shown in FIG. 9A. If a spatial spectrum I(x) of the unknown shape is obtained by the apparatus of FIG. 5, the spatial spectrum I(x) has such a shape as shown in FIG. 9B. In this case, it is judged in FIG. 9B that the shape portion having intensity not smaller than 0.5 is the unknown shape. Thus, such a shape as shown by a broken line is obtained. If the thus obtained shape shown by the broken line in FIG. 9B is compared with the true shape shown in FIG. 9C, the former is different from the latter only in that the width of the former is smaller than the latter by 10%. On the other hand, FIG. 10 shows a spatial spectrum distribution I(x) in the case where a rectangular shape is used as the reference spatial spectrum Is(x) without using a modified Gaussian distribution. If it is assumed that the shape to be drived should have intensity not smaller than 0.5, the drived shape has three grooves as indicated by circles in FIG. 10. The shape is different from the true one. This is because the spectrum has large values in a high frequency range as shown in FIG. 3B and the high frequency components cannot be reduced. In comparison with the case of FIG. 10, the result according to the present invention has reduced noises as shown in FIG. 9B so that a shape approximate to the true one can be obtained. FIG. 11 shows a comparison of the cases where the spatial spectrum Is(x) of the reference shape employs a rectangular distribution, a cosine distribution, a cosine distribution, a Gaussion distribution, etc., with the case where a modified Gaussian distribution, etc., with the case from FIG. 11, the shape obtained by using the modified Gaussion distribution is the most approximate to the true shape. FIG. 12 is a graph showing the results obtained in the cases where the apparatus according to the present invention is applied to various groove widths l. FIG. 12 shows the fact that although the difference between the measured groove width and the true one is large in the case where the true width is smaller than the reference groove width lo, the shape can be displayed with an error within a range of 13% or less with respect to the true shape in the case where the true groove width l has a value within a range of from lo to 2lo.

According to the apparatus shown in FIG. 5, if there are large variations in the measured values of the spectra Os(x) and O(x), the measured spectrum is not smooth and has discontinuous points. If the spatial spectrum having discontinuous points is subject to Fourier transformation, the high frequency components have large values. Accordingly, if the variations due to measurement errors or the like in the measured spectrum are reduced so as to smooth the shape of the measured spectrum, it is possible to reduce the high frequency components to thereby derive a clearer spatial spectrum I(x).

Figure 13:
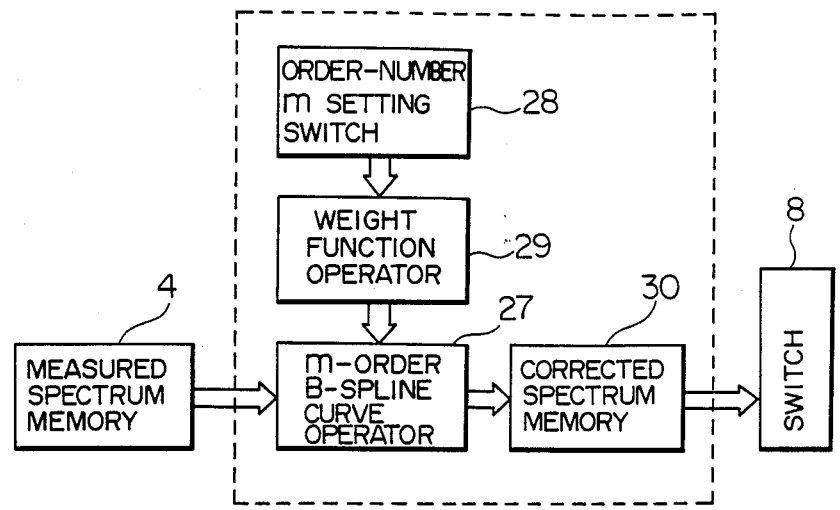
FIG. 13 is a diagram showing an additional circuit for smoothing the measured spectrum in the picture display apparatus according to the present invention.

One of the means to cope with this problem is such that the measured spectrum is approximately by an m-order B-spline curve so as to smoothly connect the discontinuous points. The B-spline curve of m order can be derived from the following equation (14).

$$B\,Sm(s) = \sum_{k=0}^{n} N_{k,m}(s)\,Vk \tag{14}$$

where Vk, n, and $N_{k,m}$ represent a sequence of points, the number of the sequence of points, and a weight function respectively. In the B-spline curve of m order, respective sections are connected through a curve of (m-l) order and are continuous to a derivative of (m-2) order. Advantageously, a variation at one measurement point has a little influence on the whole curve and the curve passes through the initial point Vo and the last point Vn. FIG. 13 shows a device for executing this processing in a broken line enclosure. Those parts of the apparatus shown in FIG. 5 exist outside the broken line enclosure in FIG. 13. In short, a circuit constituted by the parts within the broken line enclosure is additionally provided in the apparatus of FIG. 5. A weight function operator 29 performs an operation to obtain a weight function corresponding to the curve order number m set by an order-number m setting switch 28, and the result of this operation and the contents of the measured spectrum memory 4 are applied to an m-order B-spline curve operator 27. The B-spline curve operator 27 performs an operation to obtain a B-spline curve on the basis of the equation (14) and the result of this operation is stored in a corrected spectrum memory 30.

Figure 14A:
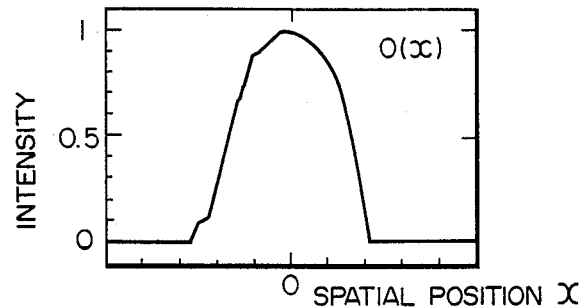
FIGS. 14A and 14B are diagrams respectively showing the results obtained in the picture display apparatus which is provided with the additional circuit shown in FIG. 13.
Figure 14B:
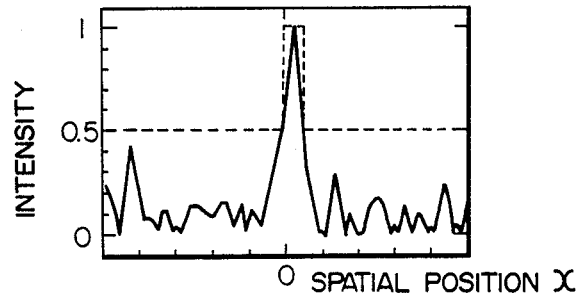

Description will be made hereunder about the performance of the new apparatus of FIG. 5 incorporated with the parts of FIG. 12. This apparatus is applied to the result of making a picture by the ultrasonic inspector of FIGS. 8A–8C. For example, in the case where the number m has been set in the measured spectrum memory 4 by the order-number m setting switch 28, the measured spectrum of FIG. 7B becomes such a corrected spectrum as shown in FIG. 14A. By the additional provision of the circuit of FIG. 13, the spatial spectrum I(x) for an object having an unknown shape is obtained as shown in FIG. 14B. In comparison of the spatial spectrum I(x) of FIG. 14B obtained by the apparatus FIG. 5 incorporated with the additional circuit of FIG. 13 with the spatial spectrum I(x) of FIG. 9B obtained by the apparatus of FIG. 5 in which the additional circuit of FIG. 13 is not incorporated, it is found that on account of the additional provision of the circuit of FIG. 12 the high frequency components of the measured spectrum are reduced so that a picture approximate to the true shape can be obtained.

According to the present invention, when the transfer function peculiar to the measurement device is measured by the apparatus of the invention, a modified Gaussian distribution composed of two Gaussian distributions is used as a spectral distribution representing the shape of a known sample, so that the oscillations of the high frequency components of the measured sepctrum due to the measurement errors can be reduced to make it possible to display a picture approximate to the true shape of an object having an unknown shape with high resolution. For example, the invention has such a meritorious effect that in the case where the size of the object having an unknown shape is within a range from the size lo of the known sample to 2lo, the unknown-shaped object can be displayed as a picture which is different in size only by 15% or less from the true one.

We claim:

1. A picture display apparatus comprising:

input means arranged to be connected to a measurement device for measuring a sample having a known shape and another sample having an unknown shape to receive a first and a second spatial spectrum distribution, respectively; first transformation means responsive to said input means for performing Fourier transformation on said first spatial spectrum distribution to obtain first Fourier transformation values representative of the measured known sample;

second transformation means responsive to said input means for performing Fourier transformation on said second spatial spectrum distribution to obtain second Fourier transformation values representative of the measured unknown sample;

first holding means for holding a third spatial spectrum distribution corresponding to the theoretical spectrum of said known-shaped sample;

third transformation means responsive to said holding means for performing Fourier transformation on said third spatial spectrum distribution to obtain third Fourier transformation values representative of the theoretical known shape;

first dividing means for dividing said first Fourier transformation values by said third Fourier transformation values to thereby derive a transfer function peculiar to the blur of said measurement device;

second holding means for holding said transfer function;

second dividing means for dividing said second Fourier transformation values by said transfer function and producing a correlated output;

fourth transformation means for performing inverse Fourier transformation on the output of said second dividing means and producing a correlated output characteristic of the unknown sample; and means for displaying said unknown-shaped sample on the basis of an output of said fourth transformation means.

2. An apparatus according to claim 1, including means providing a function of a modified Gaussian distribution that is a combination of two different Gaussian distributions to said first holding means as said third spatial spectrum distribution.

3. An apparatus according to claim 2, wherein said modified Gaussian distribution function Is(x) is defined as $$Is(x) =$$

-continued $$\begin{cases} \exp\left\{-\ln 2\left(\frac{2x}{w}\right)^2\right\} & \left(-\frac{w}{2} \leq x \leq \frac{w}{2}\right) \\ 1 - \exp\left\{-\ln 2\left(\frac{2x}{w} - 2\right)^2\right\} & \begin{pmatrix} -w \leq x \leq -\frac{w}{2} \\ \frac{w}{2} \leq x \leq w \end{pmatrix} \\ 0 & \begin{pmatrix} x \leq -w \\ x > -w \end{pmatrix} \end{cases}$$

where x and w represent a spatial position from a center of said known shape and a half-value width of said function Is(x).

4. An apparatus according to claim 3, including scanner means for spatially moving a radiant measurement beam relative to the known and unknown samples to produce a reflected radiant wave from the samples; inspector means for receiving the reflected radiant wave and producing correlated outputs as said first and second spatial spectrum distributions.

5. An apparatus according to claim 3, wherein said first holding means comprises:

means for setting said half-value width;

means for calculating said third spatial spectrum distribution on the basis of said modified Gaussian distribution function whose half-value width is set; and means for storing the calculated third spatial spectrum distribution.

6. An apparatus according to claim 5, including scanner means for spatially moving a radiant measurement beam relative to the known and unknown samples to produce a reflected radiant wave from the samples; inspector means for receiving the reflected radiant wave and producing correlated outputs as said first and second spatial spectrum distributions.

7. An apparatus according to claim 2, wherein said first holding means comprises:

means for setting said half-value width;

means for calculating said third spatial spectrum distribution on the basis of said modified Gaussian distribution function whose half-value width is set; and means for storing the calculated third spatial spectrum distribution.

8. An apparatus according to claim 7, including scanner means for spatially moving a radiant measurement beam relative to the known and unknown samples to produce a reflected radiant wave from the samples; inspector means for receiving the reflected radiant wave and producing correlated outputs as said first and second spatial spectrum distributions.

9. An apparatus according to claim 7, further comprising means disposed between said measurement device and said first and second transformation means for smoothing measured values of said first and second spatial spectrum distributions.

10. An apparatus according to claim 9, including scanner means for spatially moving a radiant measurement beam relative to the known and unknown samples to produce a reflected radiant wave from the samples; inspector means for receiving the reflected radiant wave and producing correlated outputs as said first and second spatial spectrum distributions.

11. An apparatus according to claim 2, including scanner means for spatially moving a radiant measurement beam relative to the known and unknown samples to produce a reflected radiant wave from the samples; inspector means for receiving the reflected radiant wave and producing correlated outputs as said first and second spatial spectrum distributions.

12. An apparatus according to claim 1, further comprising means disposed between said measurement device and said first and second transformation means for smoothing measured values of said first and second spatial spectrum distributions.

13. An apparatus according to claim 12, including scanner means for spatially moving a radiant measurement beam relative to the known and unknown samples to produce a reflected radiant wave from the samples; inspector means for receiving the reflected radiant wave and producing correlated outputs as said first and second spatial spectrum distributions.

14. An apparatus according to claim 12, wherein said smoothing means includes means for approximating the measured values of said first and second spatial spectrum distributions with B-spline curves.

15. An apparatus according to claim 14, including scanner means for spatially moving a radiant measurement beam relative to the known and unknown samples to produce a reflected radiant wave from the samples; inspector means for receiving the reflected radiant wave and producing correlated outputs as said first and second spatial spectrum distributions.

16. An apparatus according to claim 1, including scanner means for spatially moving a radiant measurement beam relative to the known and unknown samples to produce a reflected radiant wave from the samples; inspector means for receiving the reflected radiant wave and producing correlated outputs as said first and second spatial spectrum distributions.

17. An apparatus comprising:
input means arranged to be connected to a measurement device for measuring a sample having a known shape and another sample having an unknown shape to receive a first and a second spatial spectrum distribution, respectively; first transformation means responsive to said input means for performing Fourier transformation on said first spatial spectrum distribution to obtain first Fourier transformation values representative of the measured known sample;
second transformation means responsive to said input means for performing Fourier transformation on said second spatial spectrum distribution to obtain second Fourier transformation values representative of the measured unknown sample;
first holding means for holding a third spatial spectrum distribution corresponding to the theoretical spectrum of said known-shaped sample;
third transformation means responsive to said holding means performing Fourier transformation on said third spatial spectrum distribution to obtain third Fourier transformation values representatie of the theoretical known shape;
first dividing means for dividing said first Fourier transformation values by said third Fourier transformation values to thereby derive a transfer function peculiar to the blur of said measurement device;
second holding means for holding said transfer function;
second dividing means for dividing said second Fourier transformation values by said transfer function and producing a correlated output;
fourth transformation means for performing inverse Fourier transformation on the output of said second dividing means and producing a correlated output characteristic of the unknown sample; and
including scanner means for spatially moving a radiant measurement beam relative to the known and unknown samples to produce a reflected radiant wave from the samples;
inspector means for receiving the reflected radiant wave and producing correlated outputs as said first and second spatial spectrum distributions.

18. An apparatus according to claim 17, wherein said modified Gaussian distribution function Is(x) is defined as $$Is(x) = \begin{cases} \exp\left\{-\ln 2\left(\frac{2x}{w}\right)^2\right\} & \left(-\frac{w}{2} \leq x \leq \frac{w}{2}\right) \\ 1 - \exp\left\{-\ln 2\left(\frac{2x}{w} - 2\right)^2\right\} & \begin{pmatrix} -w \leq x \leq -\frac{w}{2} \\ \frac{w}{2} \leq x \leq w \end{pmatrix} \\ 0 & \begin{pmatrix} x \leq -w \\ x > -w \end{pmatrix} \end{cases}$$

where x and w represent a spatial position from a center of said known shape and a half-value width of said function Is(x).

19. An apparatus according to claim 18, wherein said first holding means comprises:
means for setting said half-value width;
means for calculating said third spatial spectrum distribution on the basis of said modified Gaussian distribution function whose half-value width is set; and
means for storing the calculated third spatial spectrum distribution.

20. An apparatus according to claim 19, further comprising means disposed between said measurement device and said first and second transformation means for smoothing measured values of said first and second spatial spectrum distributions.

21. An apparatus according to claim 20, wherein said smoothing means includes means for approximating the measured values of said first and second spatial spectrum distributions with B-spline curves.

22. An apparatus according to claim 18, further comprising means disposed between said measurement device and said first and second transformation means for smoothing measured values of said first and second spatial spectrum distributions.

23. An apparatus according to claim 22, wherein said smoothing means includes means for approximating the measured values of said first and second spatial spectrum distributions with B-spline curves.

* * * * *